United States Patent [19]
Snow et al.

[11] Patent Number: 5,983,487
[45] Date of Patent: Nov. 16, 1999

[54] APPARATUS FOR REPAIRING A STEAM GENERATOR TUBE

[75] Inventors: Jeffrey L. Snow, Charlottesville; Josef A. Lauer; Predrag Mastilovic, both of Lynchburg, all of Va.

[73] Assignee: Framatome Technologies, Inc., Lynchburg, Va.

[21] Appl. No.: 09/044,714

[22] Filed: Mar. 19, 1998

[51] Int. Cl.[6] .................................................. B23P 15/26
[52] U.S. Cl. ......................... 29/727; 29/726; 29/890.031
[58] Field of Search ........................... 29/727, 726, 33 G, 29/890.031; 138/89

[56] References Cited

U.S. PATENT DOCUMENTS

| | | | |
|---|---|---|---|
| 4,158,370 | 6/1979 | Larson | 138/89 |
| 4,449,280 | 5/1984 | Schroeder | 29/421 |
| 4,513,497 | 4/1985 | Finch | 29/727 |
| 5,038,994 | 8/1991 | Feldstein et al. | 228/2.5 |

OTHER PUBLICATIONS

EnVision–Nuclear Services; First–of–a–kind Re–sleeving process, undated, admitted prior art.

Primary Examiner—I. Cuda
Attorney, Agent, or Firm—Rhodes & Mason, PLLC

[57] ABSTRACT

An apparatus for expanding an existing repair sleeve in a steam generator to permit a new repair sleeve to be installed. The apparatus includes a variable cross-section elongated cylindrical capsule adapted to be positioned within the existing repair sleeve and an explosive charge inside the capsule whereby detonation of the charge expands the existing repair sleeve to permit the new repair sleeve to be installed. The variable cross-section of the capsule permits the explosive force to be "tuned" so that the existing tube expands evenly along its entire length, including the hard to expand ends of the existing sleeve, without overexpanding the tube. In the preferred embodiment, the apparatus includes a conduit attached to one end of the capsule and at least one sleeve position indicator associated with the conduit. The sleeve position indicator associated with the conduit may be a predetermined index mark on the outer surface of the conduit, a hard stop located between the conduit and the capsule or both.

42 Claims, 5 Drawing Sheets

APPARATUS FOR REPAIRING A STEAM GENERATOR TUBE

BACKGROUND OF THE INVENTION (1) Field of the Invention

The present invention relates generally to an apparatus for repairing tubes of heat exchangers in a nuclear system and, more particularly, to an apparatus for expanding an existing repair sleeve in a steam generator to permit a new repair sleeve to be installed.

(2) Description of the Prior Art

The tubes of heat exchangers such as steam generators, oil coolers, reheaters or feedwater heat exchangers, in particular those of power plants, are subjected to high mechanical and thermal stresses as well as the corrosive action of the fluid which passes therethrough. The severity of the environment causes degradation of the tubes. The process of replacing tubes, particularly in power plants where down time must be limited, is both expensive and time consuming. Therefore, it is highly desirable to forestall replacement by repairing localized defects.

It is known to remove from service defective tubes by plugging them. However, plugging is only a limited remedy as it reduces the overall heat transfer surface area of the heat exchanger, and thereby materially reduces its efficiency.

Further, it is known to repair a localized tube defect by installing an inner sleeve which spans the defect. The sleeve is inserted through the end of the tube and thereafter attached near its ends to form a sealing engagement with the tube. Such expansion may be accomplished by mechanical rolling, hydraulic or explosive expansion. The sleeve can be welded into place by TIG, laser or explosive means.

A sleeve also may be used to repair a defective portion of a tube not at a tube sheet by expanding the sleeve into the tube to span the defect with a set of expansions on either side of the tube defect. In the free-span portion of the tube, where it is not backed by the tube sheet material, the risk of over expanding the tube is great if the expansion process is not tightly controlled. If an overexpansion occurs, the tube may crack either during the expansion operation or during the operation of the heat exchanger due to high stresses in the expanded region.

The acceptable leak rate between the sleeve and tube is an issue within all designs of heat exchangers. However, in radioactively contaminated heat exchangers, the leakage from the contaminated side of the tube to the clean side will result in the contamination of otherwise clean system components. In heat exchangers with dissimilar fluids on each side of the tube, such as an oil cooler, where one side of the tube is filled with water and the other with oil, leakage will result in the mixing of one fluid with the other, a potentially unacceptable situation that may result in damage to other system components. Finally, in pre-heater or feedwater heat exchangers, the leakage of fluid from one side of the tube to the other will result in the loss of efficiency of the unit. Based on the type of heat exchanger to be sleeved, an acceptable leak rate for the sleeve can be determined. In cases where the flow rate through the heat exchanger is high and the risk of contamination or damage to the system components is low, a higher leak rate may be acceptable.

In the past, once a tube was sleeved it was impossible to make another repair at the same location if the sleeve leaked. Worse still, if another leak occurred above the repair, there was no way to get a sleeve to the other leak. As a result the tube would have to be plugged. After too many tubes are plugged, the plant efficiency becomes so poor that the steam generators either must be replaced or the entire plant shutdown.

Other methods for addressing this problem have been proposed. These include the autogenous or filler weld repair of sleeves. These techniques can be very difficult to perform on degraded sleeves. Moreover, experience has shown that it is difficult to clean the area to be welded on degraded sleeves. Improper cleaning leads to problems with weld inclusions. Also, placing a sleeve within a sleeve has been proposed but the constriction that results would significantly degrade the performance of the tube.

Thus, there exists the need for an apparatus for expanding an existing repair sleeve to permit a new repair sleeve to be installed inside while, at the same time, reducing the possibility that the tube would be ruptured during the repair process.

SUMMARY OF THE INVENTION

The present invention is directed to an apparatus for expanding an existing repair sleeve in a steam generator to permit a new repair sleeve to be installed. This ability to expand a previously repaired tube is important because in the past, once a tube developed problems after repair, the available repair alternatives were ineffective. Understandably, if a significant number of tubes have to be removed from service, heat exchanger performance is degraded.

The apparatus includes a variable cross-section elongated cylindrical capsule adapted to be positioned within the existing repair sleeve and an explosive charge inside the capsule whereby detonation of the charge expands the existing repair tube to permit the new repair sleeve to be installed. The variable cross-section of the capsule permits the explosive force to be "tuned" so that the existing sleeve is sufficiently expanded along its entire length, including the hard to expand ends of the existing sleeve, without over-expanding the outer steam generator tube.

In the preferred embodiment, the apparatus includes a conduit attached to one end of the capsule and at least one sleeve position indicator associated with the conduit. The sleeve position indicator associated with the conduit may be a predetermined index on the outer surface of the conduit, a hard stop located on the conduit or the capsule or both.

Accordingly, one aspect of the present invention is to provide an apparatus for expanding an existing repair sleeve in a steam generator to permit a new repair sleeve to be installed. The apparatus includes: (a) a variable cross-section capsule adapted to be positioned within the existing repair sleeve; and (b) an explosive charge inside the capsule, whereby detonation of the charge expands the existing repair sleeve to permit the new repair sleeve to be installed.

Another aspect of the present invention is to provide an apparatus for expanding an existing repair sleeve in a steam generator to permit a new repair sleeve to be installed. The apparatus includes: (a) a variable cross-section elongated cylindrical capsule adapted to be positioned within the existing repair sleeve; and (b) an explosive charge inside the capsule, whereby detonation of the charge expands the existing repair sleeve to permit the new repair sleeve to be installed.

Still another aspect of the present invention is to provide an apparatus for expanding an existing repair sleeve in a steam generator to permit a new repair sleeve to be installed. The apparatus includes: (a) a variable cross-section elongated cylindrical capsule adapted to be positioned within the existing repair sleeve; (b) an explosive charge inside the capsule; and (c) means for positioning the capsule within the existing repair sleeve, whereby detonation of the charge expands the existing repair sleeve to permit the new repair sleeve to be installed.

These and other aspects of the present invention will become apparent to those skilled in the art after a reading of the following description of the preferred embodiment when considered with the drawings.

DESCRIPTION OF THE PREFERRED EMBODIMENTS

Figure 1:
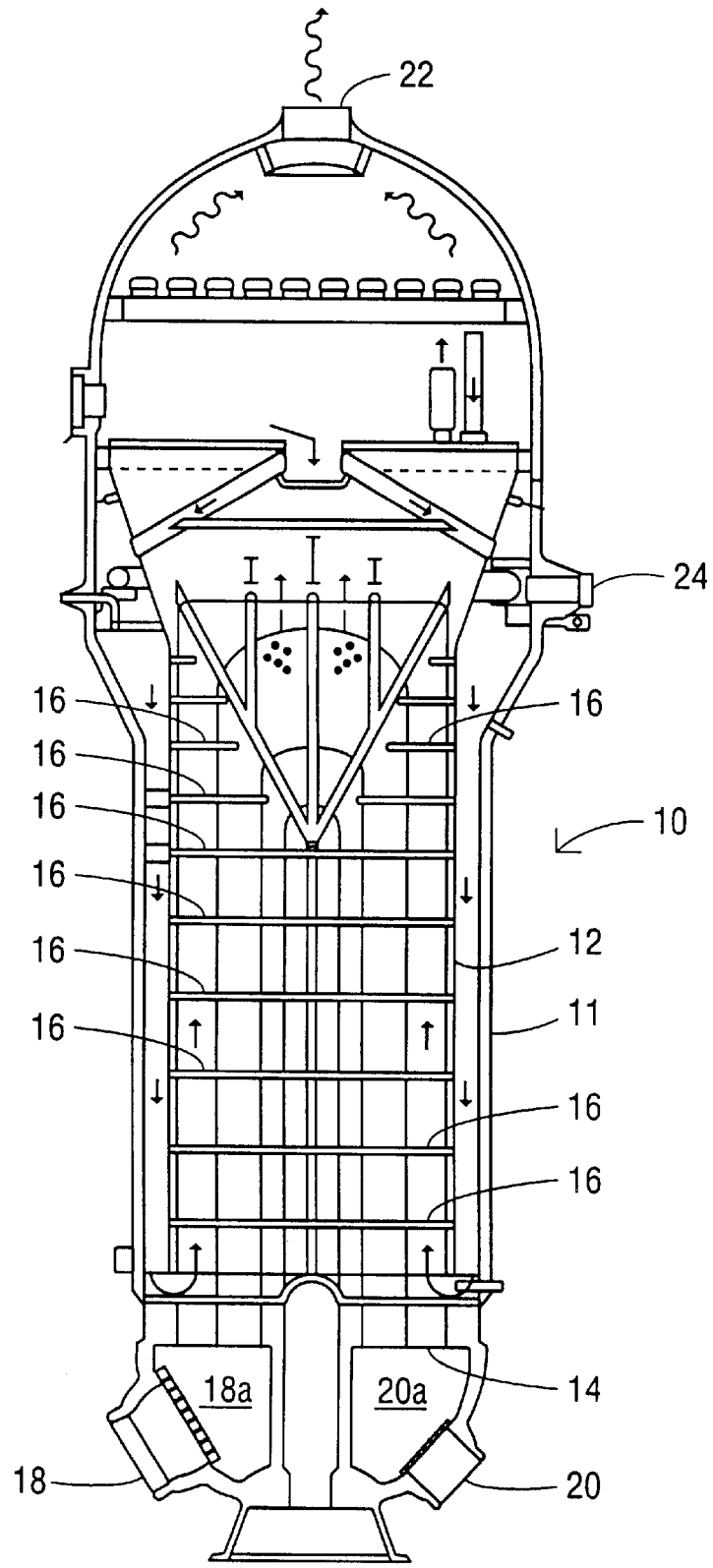
FIG. 1 is a schematic representation of a nuclear steam generator.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, there is shown a schematic representation of a heat exchanger such as a steam generator (SG), generally designated 10, of the type used in a pressurized water nuclear reactor (PWR).

The SG shell 11 includes a primary coolant inlet 18 and primary coolant outlet 20. A feedwater inlet 24 is provided in the upper portion of the SG and a steam outlet is provided at the top of the SG. Numerous other components such as steam separators, baffles, and stream dryers may also be used but are not shown for the sake of simplicity.

The lower portion of the shell 11 contains a u-shaped tube bank 12 that is anchored in a tube sheet 14. Individual tubes within tube bank 12 are supported by numerous tube support plates 16. Primary coolant enters the tube bank 12 at inlet header 18a travels through the tubes where the primary coolant gives up its heat energy to feedwater entering at 24. The primary coolant exits the SG via outlet header 20a. The tube sheet 14 is quite massive having a typical thickness of approximately 22 inches. A tube sheet may contain several thousand tube openings.

The tubes may have been repaired using tube sleeves which constitute obstructions to fluid flow and heat exchange between primary and secondary coolant and the insertion of additional repair sleeves. The present invention is directed to the kinetic expansion of an existing obstruction to permit a repair item such as a sleeve to be inserted into the tube.

Figure 2:
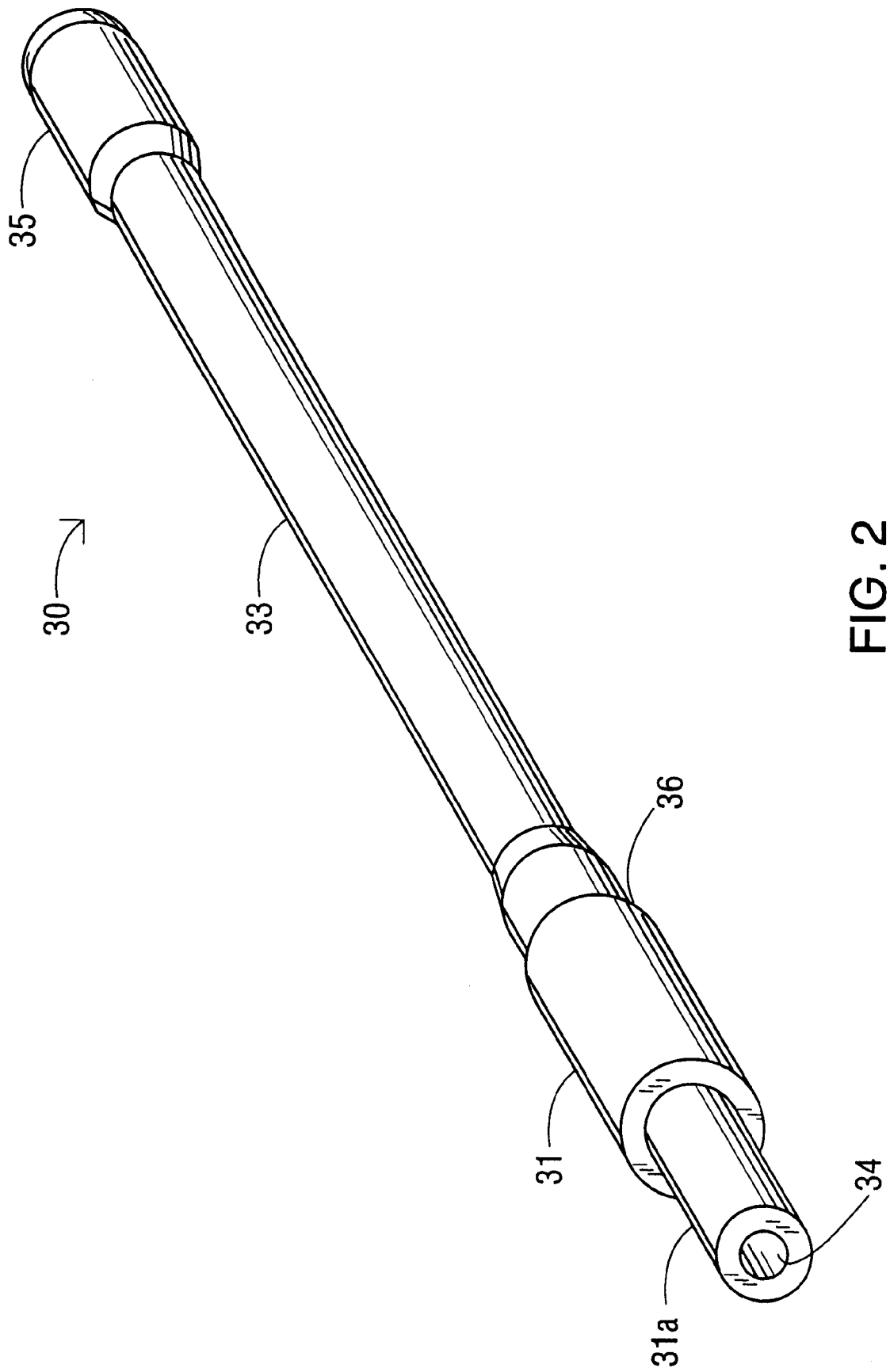
FIG. 2 is a perspective view of a variable cross-section capsule that is part of the tuned charge kinetic device constructed according to the present invention.
Figure 3:
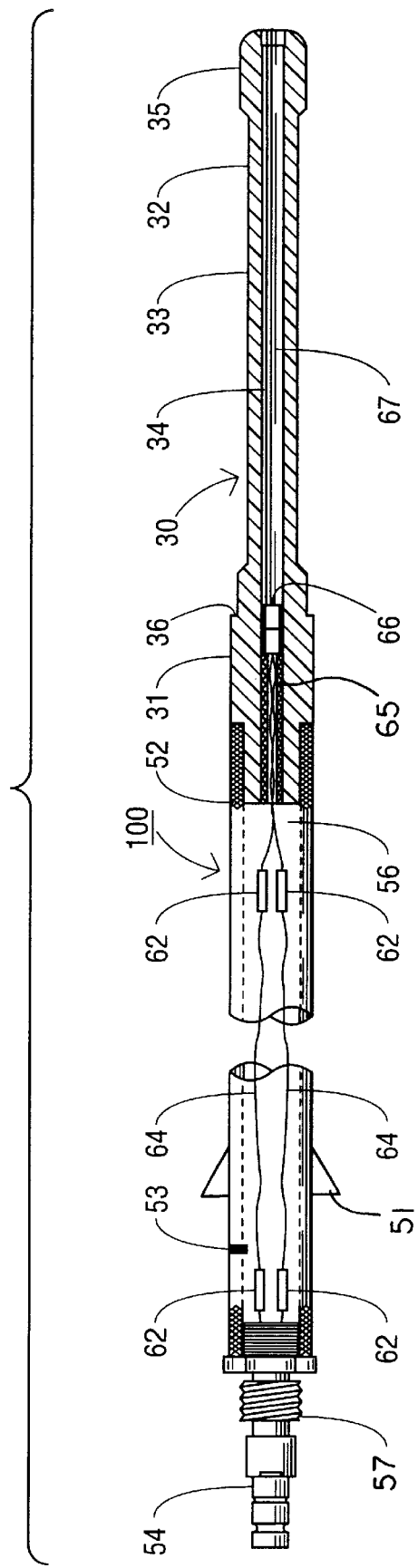
FIG. 3 is a cross sectional view of the tuned charge kinetic device and the positioning means of the present invention.

Referring now to FIGS. 2 and 3, the present invention includes a "tuned" charge kinetic device (TCKD) indicated generally at 30 and a positioning means indicated generally at 100. The TCKD includes a variable cross-section elongated cylindrical capsule 32 having a central cavity 34 along its longitudinal axis. Preferably, capsule 32 is constructed of a resilient material such as some type of polymer. A preferred polymer is low density, elastic polyethylene although other polymers such as polypropylene, polystyrene and polyvinyl chloride are believed to be acceptable. Other materials such as hard metals and ceramics are also acceptable so long as they fracture to permit easy removal. Similarly, very soft metals or plastics can be used as long as their remnants do not constitute an unacceptable obstruction.

The central cavity 34 contains an explosive 67. One end of the capsule 32 may be sealed with a plug to contain explosive 67. In a preferred embodiment, the central portion of the capsule 32 has a smaller outside diameter than its first end 31 and its second end 35. Either one end or both ends of capsule may have the larger diameter somewhat bulbous shape shown in FIGS. 2 and 3. Capsule includes a nipple 31a at the end that will engage positioning means 100.

Positioning means 100 includes conduit 52 having initiator channel 56. One end of conduit receives nipple 31a to hold capsule 32 securely. Conduit is fabricated from a flexible material to allow it to deform sufficiently through tight quarters into tube sheet 14. A preferred material for this element is some type of sufficiently flexible polymer. A preferred polymer is nylon or polyethylene for its strength although other polymers are useful.

At its opposite end conduit 52 includes threaded plug 57 through which extends connector 54 and wires 64. Wires 64 extend from a point near threaded plug 57 through conduit 52 and into cavity 34. Wire splices 62 are provided as necessary depending on the length of conduit to connect detonator 66 electrically to connector. Depending on the diameter of detonator 66, an optional detonator sleeve 65 may be used to ensure that the detonator is held securely inside cavity 34. Alternatively, capsule 32 may be machined to allow for detonator fit without a sleeve 65.

Detonator 66 is connected electrically to a remotely located detonation box via connector 54. Thus explosive 67 may be detonated electrically or may be detonated using detonation cord or similar devices.

Figure 4A:
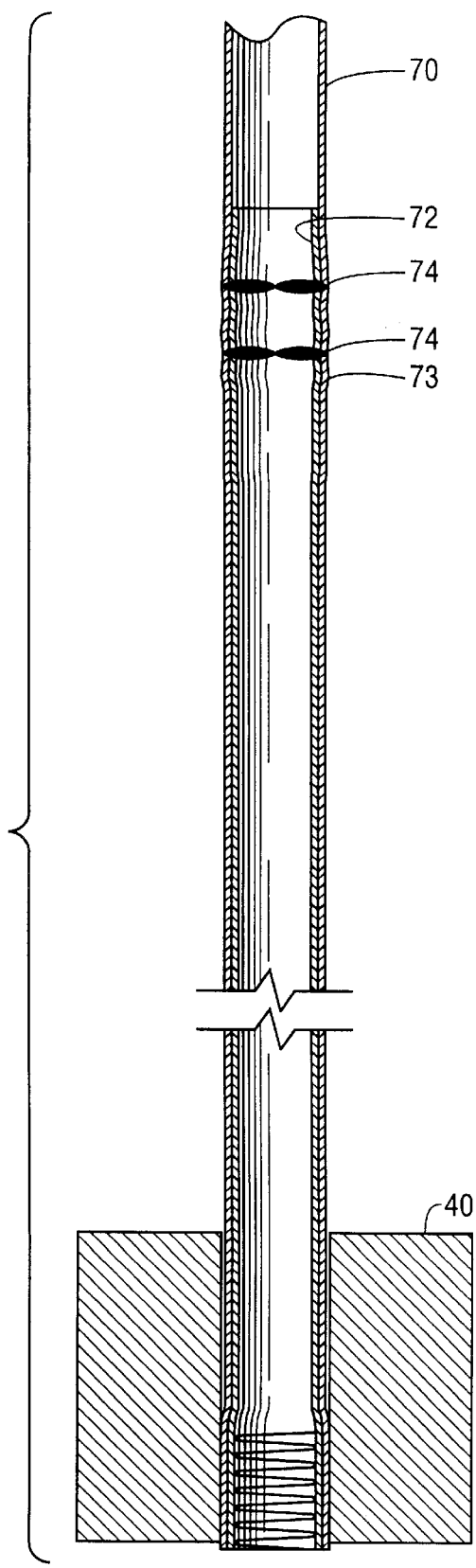
FIGS. 4A–4D illustrate the steps of removing and expanding an existing defective sleeve from a steam generator tube and the use of the apparatus of the present invention to prepare the tube for installation of a new sleeve.
Figure 4B:
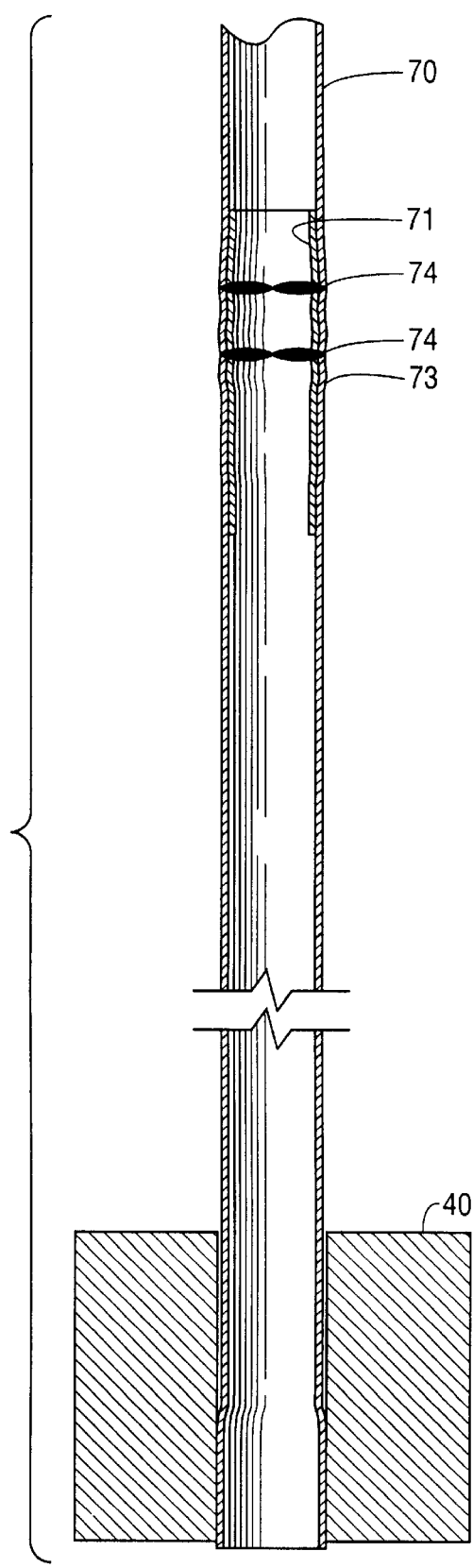
Figure 4C:
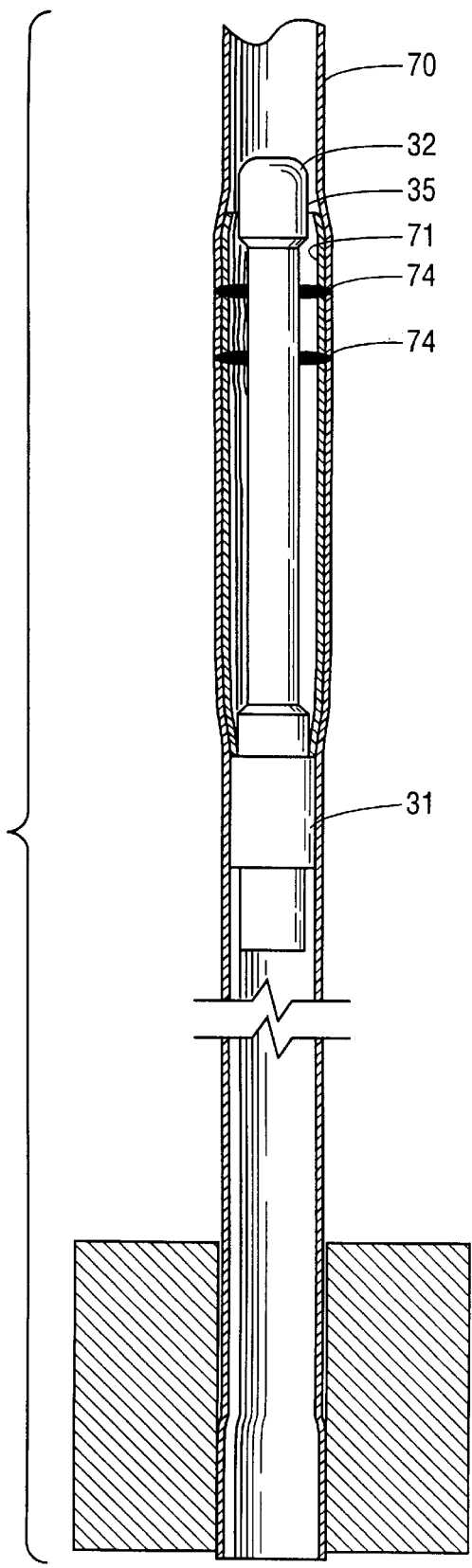

FIGS. 4A–4D illustrate the steps of using the apparatus of the present invention to prepare a previously sleeved tube for the installation of a new sleeve. FIG. 4A is a sectional view of part of a tube sheet showing a tube 70 which contains a sleeve 72. The sleeve is held in place at one end by welds 74 and in the tube sheet 40 by mechanical expansion hard rolling. The length of tube 70 near the upper portion of the sleeve 72 typically is slightly expanded 73 as a result of the technique used to install the sleeve. As a first step the hard roll expansion is relaxed using a heating method, drilling or other methods. The sleeve is then severed below the expanded area 73. (FIG. 4B) The lower portion of the tube is then extracted using a mechanical gripper and a jack. The remaining sleeve remnant 71 will have a length of about 4 to 6 inches.

Next the TCKD is inserted up through tube sheet and into the freespan region of the tube. (FIG. 4C) The term freespan refers to that portion of the tube which is not contained in the tube sheet 40 or any tube support plate 16. Accurate positioning of the TCKD at the appropriate vertical height is important to ensure that controlled expansion of the tube takes place. The TCKD should be positioned substantially centered in the tube with light contact between the wide diameter portions 31, 35 of capsule 32.

Desirably the capsule 32 should be sized and positioned such that the configuration of explosive allows sufficient expansion of the sleeve remnant 71. The explosive may be distributed evenly along the length of cavity 34 so as to fill it completely or, alternatively, may be formed into segments at spaced apart intervals along cavity 34. Each segment is detonated near simultaneously to expand the tube.

Positioning means 100 (FIG. 3) includes a tube grip 51 secured to conduit 52. Tube grip 51 holds positioning means 100 in place as conduit is inserted into tube by filling the space between the inner diameter of tube 70 and the outside diameter of conduit 52. Positioning means 100 also includes a sleeve position indicator to inform technicians when the TCKD has been inserted to the proper height in the tube. The indicator can take the form of an index 53 placed on the exterior of conduit 52. Alternatively, the indicator may take the form of a hard stop 36 (FIG. 3) which contacts sleeve remnant 71 to stop the upward travel of the TCKD at the proper point. A combination of a hard stop and an index may be used to ensure proper positioning of the TCKD.

An extension sheath is provided positioning means 100 joined thereto at connector 54 and threaded plug 57. The sheath carries its own connector to mate with connector 54 of positioning means 100. The function of extension sheath is to carry electrical power from a remote detonation box to detonator 66. It can also contain a detonation cord or other means of initiating a detonation.

After the capsule 32 is positioned appropriately in tube 70, explosive is detonated. The type of explosive used may vary. Suitable explosives include Pentaerythritol Tetranitrate (PETN) detonation cord, PETN or Nitroguanadine (NGU) powder and PETN plastic explosive in a shaped charge. Particularly preferred is 100 grain/ft detonation cord. The practice of the present invention includes varying the type of explosive as needed to fit a particular tube size or construction.

The detonation of explosive 67 in capsule 32 causes a controlled expansion in the tube at the location of sleeve remnant 71. This expansion effect is greater at either end of capsule 32 where there is contact with tube 70 than in that portion of the tube adjacent the central portion of capsule 32. The airgap between the capsule 32 and tube 70 reduces the pressure wave delivered to the tube 70 in that portion. A greater pressure wave is delivered near the ends of capsule 32 where the airgap is reduced. Thus the delivery of the explosive force is "tuned" to created a generally bulged region of the tube having bulbous zones 80,82 at the top end and at the bottom end of the now expanded bulged region 81. The amount of bulging may be controlled through the selection of the type and quantity of explosive as well as the shape of capsule 32 to accommodate the shape and mass of the object to be expanded.

Given the particularized shape to be imparted to the tube, the selection of the capsule material, explosive charge and geometry is important. Preferably, capsule 32 should be resilient so as to expand with the force of explosive but should then return close to its original shape. To the extent that the capsule deteriorates after the explosion, it should leave behind a minimum amount of a reasonably easy to clean residue. Alternatively, the capsule can be expanded and become part of the expanded sleeve and tube as long as it does not create a constriction to new sleeving. The scope of the present invention includes using all materials which have this performance characteristic.

Figure 4D:
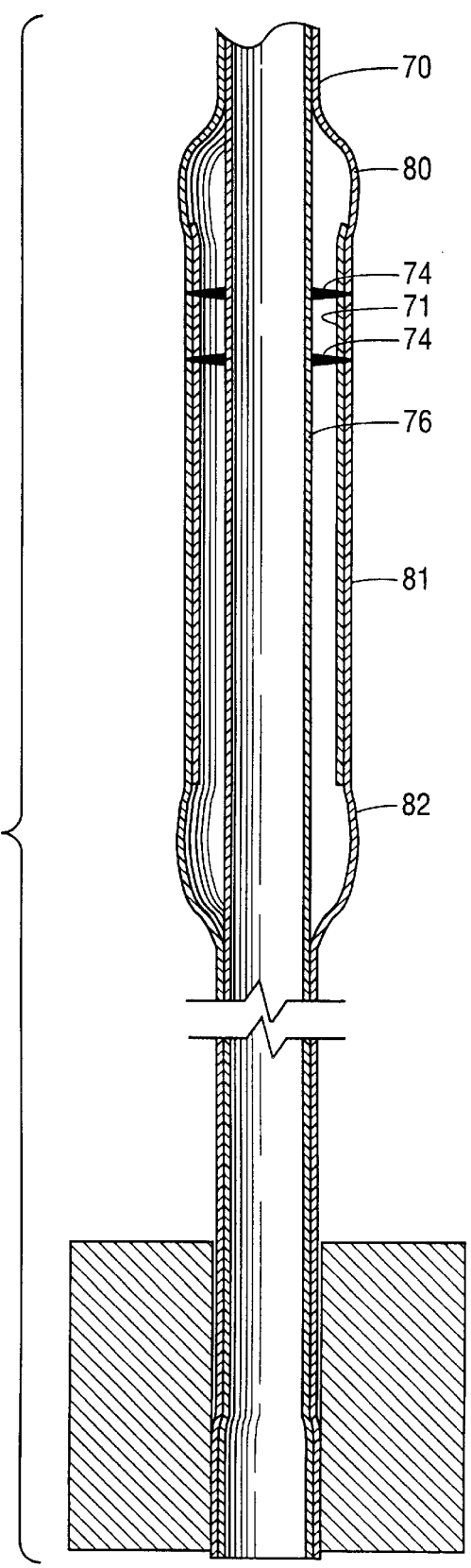

After tube 70 and sleeve remanent 71 have been expanded by explosive 67, any capsule residue must be removed and the repair area cleaned. Next, a replacement sleeve 76 is inserted in tube 70 as shown in FIG. 4D. The replacement sleeve 76 is positioned so that its upper end falls slightly above the newly expanded portion 81 of tube 70. Replacement sleeve 76 may be secured at its upper end by one or more welds and at its lower end by expansion or welding. A sleeve may also be created by electro-deposition.

Certain modifications and improvements will occur to those skilled in the art upon a reading of the foregoing description. By way of example, a brittle capsule which shatters may be used in lieu of a resilient capsule. Also, the explosive may comprise a compressed powder in a contoured shape in place of detonation cord. Also, the practice of the present invention comprehends attaching the explosive to the outside of the capsule. Alternatively, a combination of both inside and outside placement of the explosive may be used. It should be understood that all such modifications and improvements have been deleted herein for the sake of conciseness and readability but are properly within the scope of the following claims.

We claim:

1. An apparatus for expanding an existing repair sleeve in a heat exchanger to permit a new repair sleeve to be installed, said apparatus comprising:
    (a) a variable outer cross-section capsule adapted to be positioned within said existing repair sleeve; and
    (b) an explosive charge inside said capsule, whereby detonation of said charge expands said existing repair sleeve to permit said new repair sleeve to be installed.

2. The apparatus according to claim 1, further including means for positioning said capsule within said existing repair sleeve.

3. The apparatus according to claim 2, wherein said positioning means includes a conduit attached to one end of said capsule and at least one sleeve position indicator associated with said conduit.

4. The apparatus according to claim 3, wherein said sleeve position indicator associated with said conduit is a predetermined index mark on the outer surface of said conduit.

5. The apparatus according to claim 3, wherein said sleeve position indicator associated with said conduit is a hard stop located between said conduit and said capsule.

6. The apparatus according to claim 5, wherein said sleeve position indicator associated with said conduit further includes a predetermined index mark on the outer surface of said conduit.

7. The apparatus according to claim 1, wherein said conduit is formed from a flexible material.

8. The apparatus according to claim 7, wherein said conduit is formed from a polymer.

9. The apparatus according to claim 8, wherein said conduit is formed from nylon.

10. The apparatus according to claim 1, wherein said conduit includes a channel for containing an initiator connected between said explosive and a detonator.

11. The apparatus according to claim 1, wherein said conduit further includes a tube grip for maintaining the position of said conduit.

12. The apparatus according to claim 1, further including an extension sheath attached between said conduit and said capsule, said extension sheath including a channel for containing an initiator connected between said explosive and a detonator.

13. An apparatus for expanding an existing repair sleeve in a heat exchanger to permit a new repair sleeve to be installed, said apparatus comprising:
    (a) a variable outer cross-section elongated cylindrical capsule adapted to be positioned within said existing repair sleeve; and (b) an explosive charge associated with said capsule, whereby detonation of said charge expands said existing repair tube to permit said new repair sleeve to be installed.

14. The apparatus according to claim 13, wherein said capsule is formed from an elastic polymer.

15. The apparatus according to claim 14, wherein said elastic polymer is a low density polyethylene.

16. The apparatus according to claim 13, wherein said variable cross-section capsule includes at least two different diameters.

17. The apparatus according to claim 16, wherein said variable cross-section capsule includes a larger diameter portion at one end of said capsule.

18. The apparatus according to claim 16, wherein said variable cross-section capsule includes a larger diameter portion at both ends of said capsule.

19. The apparatus according to claim 13, wherein said explosive is placed substantially along the entire length of said capsule.

20. The apparatus according to claim 13, wherein said explosive is placed at space apart intervals along the length of said capsule.

21. The apparatus according to claim 13, wherein said explosive is placed along the length of said capsule in correlation with respect to the diameter of said capsule with the amount of explosive being increased where the diameter of said capsule increases.

22. The apparatus according to claim 13, wherein said capsule further includes a tube grip for maintaining the position of said conduit.

23. An apparatus for expanding an existing repair sleeve in a heat exchanger to permit a new repair sleeve to be installed, said apparatus comprising:

(a) a variable outer cross-section elongated cylindrical capsule adapted to be positioned within said existing repair sleeve;

(b) an explosive charge associated with said capsule; and (c) means for positioning said capsule within said existing repair sleeve, whereby detonation of said charge expands said existing repair tube to permit said new repair sleeve to be installed.

24. The apparatus according to claim 23, wherein said positioning means includes a conduit attached to one end of said capsule and at least one sleeve position indicator associated with said conduit.

25. The apparatus according to claim 24, wherein said sleeve position indicator associated with said conduit is a predetermined index mark on the outer surface of said conduit.

26. The apparatus according to claim 24, wherein said sleeve position indicator associated with said conduit is a hard stop located between said conduit and said capsule.

27. The apparatus according to claim 26, wherein said sleeve position indicator associated with said conduit further includes a predetermined index mark on the outer surface of said conduit.

28. The apparatus according to claim 23, wherein said conduit is formed from a flexible material.

29. The apparatus according to claim 28, wherein said conduit is formed from a polymer.

30. The apparatus according to claim 29, wherein said conduit is formed from nylon.

31. The apparatus according to claim 23, wherein said conduit includes a channel for containing an initiator connected between said explosive and a detonator.

32. The apparatus according to claim 23, wherein said conduit further includes a tube grip for maintaining the position of said conduit.

33. The apparatus according to claim 23, further including an extension sheath attached between said conduit and said capsule, said extension sheath including a channel for containing an initiator connected between said explosive and a detonator.

34. The apparatus according to claim 23, wherein said capsule is formed from an elastic polymer.

35. The apparatus according to claim 34, wherein said elastic polymer is a low density polyethylene.

36. The apparatus according to claim 23, wherein said variable cross-section capsule includes at least two different diameters.

37. The apparatus according to claim 36, wherein said variable cross-section capsule includes a larger diameter portion at one end of said capsule.

38. The apparatus according to claim 36, wherein said variable cross-section capsule includes a larger diameter portion at both ends of said capsule.

39. The apparatus according to claim 23, wherein said explosive is placed substantially along the entire length of said capsule.

40. The apparatus according to claim 23, wherein said explosive is placed at space apart intervals along the length of said capsule.

41. The apparatus according to claim 23, wherein said explosive is placed along the length of said capsule in correlation with respect to the diameter of said capsule with the amount of explosive being increased where the diameter of said capsule increases.

42. The apparatus according to claim 23, wherein said capsule further includes a tube grip for maintaining the position of said conduit.

* * * * *